(12) United States Patent
Drake et al.

(10) Patent No.: US 10,088,161 B2
(45) Date of Patent: Oct. 2, 2018

(54) GAS TURBINE ENGINE WALL ASSEMBLY WITH CIRCUMFERENTIAL RAIL STUD ARCHITECTURE

(71) Applicant: United Technologies Corporation, Farmington, CT (US)

(72) Inventors: Christopher Drake, Atlanta, GA (US); Stanislav Kostka, Jr., Shrewsbury, MA (US); Frank J. Cunha, Avon, CT (US)

(73) Assignee: United Technologies Corporation, Farmington, CT (US)

( * ) Notice: Subject to any disclaimer, the term of this patent is extended or adjusted under 35 U.S.C. 154(b) by 22 days.

(21) Appl. No.: 15/038,906

(22) PCT Filed: Aug. 29, 2014

(86) PCT No.: PCT/US2014/053502
§ 371 (c)(1),
(2) Date: May 24, 2016

(87) PCT Pub. No.: WO2015/094430
PCT Pub. Date: Jun. 25, 2015

(65) Prior Publication Data
US 2017/0159935 A1 Jun. 8, 2017

Related U.S. Application Data

(60) Provisional application No. 61/918,429, filed on Dec. 19, 2013.

(51) Int. Cl.
*F23R 3/00* (2006.01)
*F02C 7/18* (2006.01)

(52) U.S. Cl.
CPC .............. *F23R 3/002* (2013.01); *F02C 7/18* (2013.01); *F05D 2220/323* (2013.01); *F05D 2230/60* (2013.01); *F05D 2240/35* (2013.01); *F05D 2260/201* (2013.01)

(58) Field of Classification Search
CPC .................................. F23R 3/002; F23R 3/06
See application file for complete search history.

(56) References Cited

U.S. PATENT DOCUMENTS

| | | | |
|---|---|---|---|
| 6,408,628 B1 | 6/2002 | Pidcock et al. | |
| 6,701,714 B2 * | 3/2004 | Burd | F23M 5/02 60/752 |
| 7,093,439 B2 | 8/2006 | Pacheco-Tougas et al. | |
| 7,140,185 B2 * | 11/2006 | Burd | F23M 5/085 110/336 |
| 7,493,767 B2 | 2/2009 | Bunker et al. | |
| 7,788,928 B2 | 9/2010 | De Sousa et al. | |

(Continued)

OTHER PUBLICATIONS

Richard Budynas, Advanced Strength and Analysis: Chapter 5.9 Contact Stresses, 1999, McGraw Hill, Second Edition, p. 357-364.*

(Continued)

*Primary Examiner* — Andrew Nguyen
*Assistant Examiner* — Stephanie Cheng
(74) *Attorney, Agent, or Firm* — O'Shea Getz P.C.

(57) ABSTRACT

A liner panel for use in a gas turbine engine. The liner panel has a hot side and a cold side. The liner panel includes a rail extending from the cold side and a multiple of studs extending from the cold side. At least one of the multiple of studs extends from, in part, the rail.

17 Claims, 11 Drawing Sheets

(56) References Cited

U.S. PATENT DOCUMENTS

| | | |
|---|---|---|
| 8,113,004 B2 | 2/2012 | Carlisle et al. |
| 8,256,224 B2 | 9/2012 | Garry et al. |
| 8,266,914 B2 | 9/2012 | Hawie et al. |
| 8,359,865 B2 | 1/2013 | Dierberger et al. |
| 8,359,866 B2 | 1/2013 | Dierberger et al. |
| 8,393,155 B2 | 3/2013 | Piper et al. |
| 8,408,010 B2 | 4/2013 | Garry et al. |
| 2002/0050237 A1* | 5/2002 | Becker .................. F23R 3/002 110/336 |
| 2002/0116929 A1 | 8/2002 | Snyder |
| 2002/0184892 A1 | 12/2002 | Calvez et al. |
| 2003/0213250 A1* | 11/2003 | Pacheco-Tougas ..... F23R 3/002 60/752 |
| 2005/0022531 A1 | 2/2005 | Burd |
| 2005/0086940 A1 | 4/2005 | Coughlan, III et al. |
| 2005/0227106 A1 | 10/2005 | Schlichting et al. |
| 2007/0144178 A1 | 6/2007 | Burd et al. |
| 2007/0186558 A1 | 8/2007 | De Sousa et al. |
| 2007/0186559 A1 | 8/2007 | De Sousa et al. |
| 2010/0095678 A1 | 4/2010 | Hawie et al. |
| 2010/0095679 A1 | 4/2010 | Rudrapatna et al. |
| 2012/0255311 A1* | 10/2012 | Miyake ................. F23R 3/005 60/806 |
| 2013/0025287 A1 | 1/2013 | Cunha |
| 2013/0192233 A1 | 8/2013 | Eastwood et al. |
| 2013/0247575 A1 | 9/2013 | Patel et al. |
| 2015/0027128 A1* | 1/2015 | Benkler ................. F23R 3/005 60/754 |
| 2016/0273772 A1 | 9/2016 | Cunha et al. |

OTHER PUBLICATIONS

Oates, Gordon C., "Aircraft Propulsion Systems Technology and Design:Henderson: Chapter 2: Turbopropulsion Combustion Technology by Henderson, Robert E.; Blazowski, William S", 1989, AIAA Education Series: Washington, DC: American Institute of Aeronautics and Astronautics, p. 111.*

Extended EP Search Report dated Feb. 12, 2016.

* cited by examiner

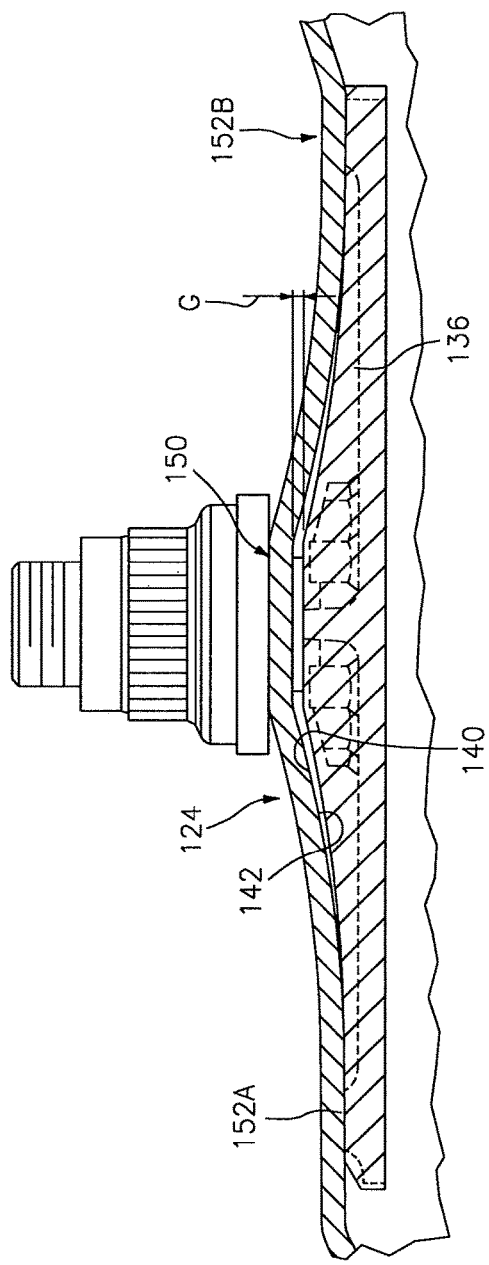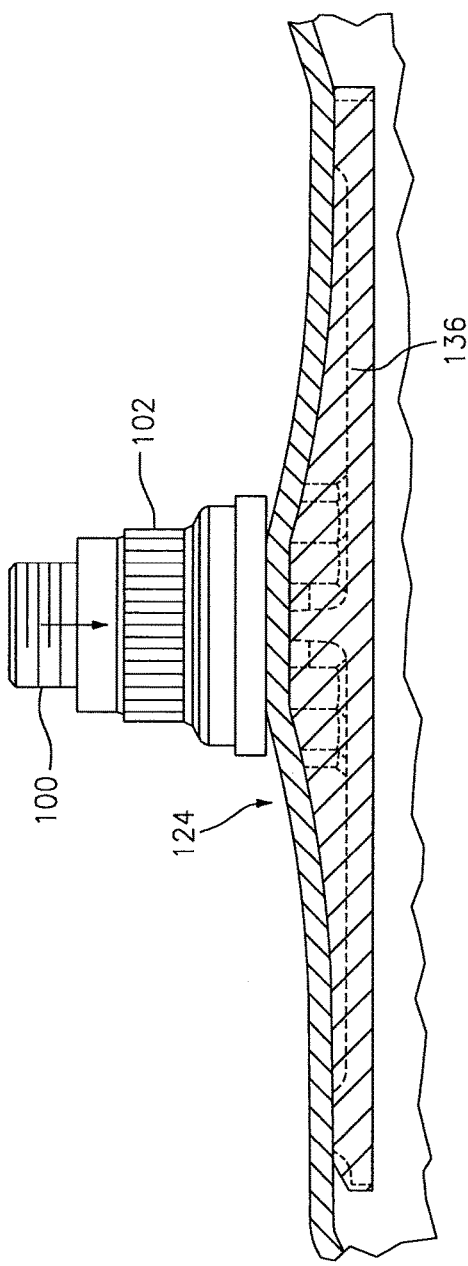

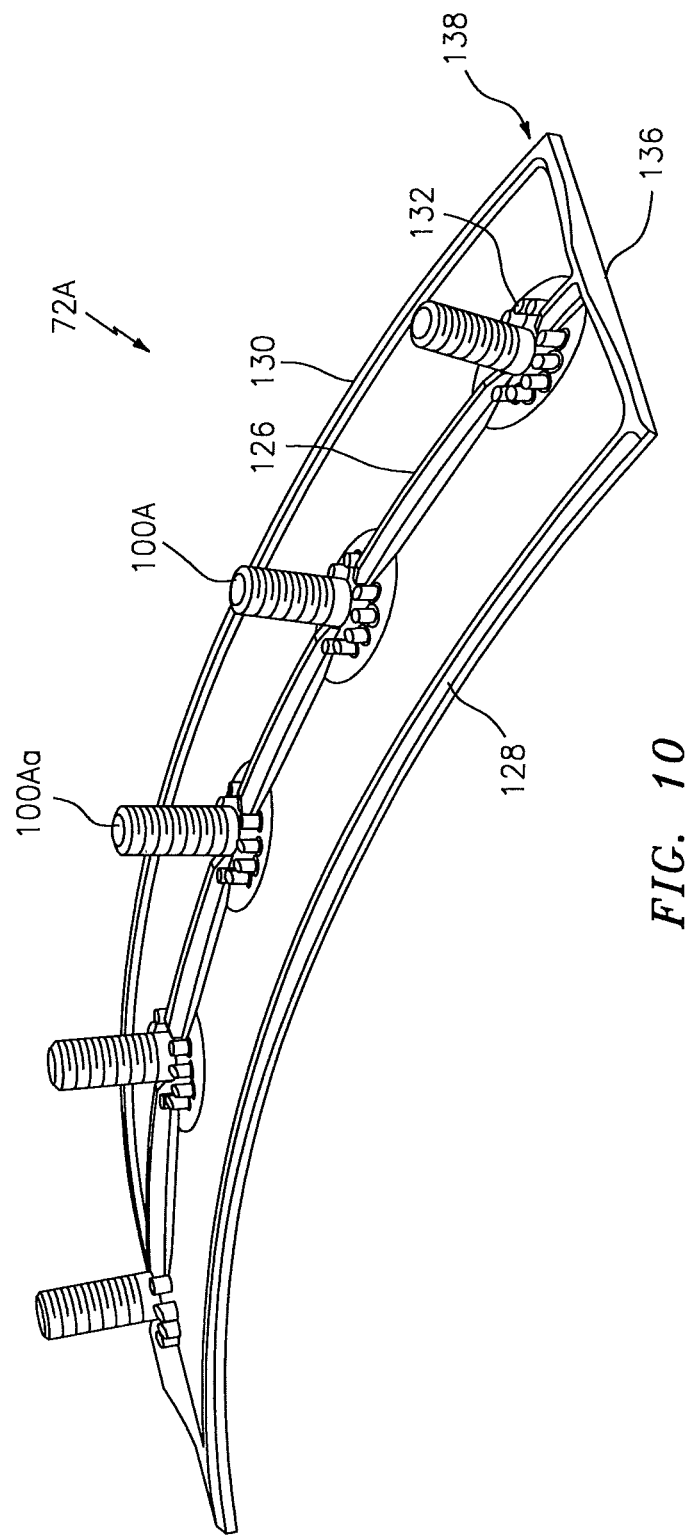

GAS TURBINE ENGINE WALL ASSEMBLY WITH CIRCUMFERENTIAL RAIL STUD ARCHITECTURE

CROSS-REFERENCE TO RELATED APPLICATION

This application claims priority to PCT patent application Ser. No. PCT/US14/053502 filed Aug. 29, 2014, which claims priority to U.S. patent application Ser. No. 61/918,429 filed Dec. 19, 2013, which are hereby incorporated herein by reference in their entireties.

This disclosure was made with Government support under FA8650-09-D-2923 0021 awarded by the United States Air Force. The Government may have certain rights in this disclosure.

BACKGROUND

The present disclosure relates to a gas turbine engine and, more particularly, to a combustor section therefor.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

Among the engine components, relatively high temperatures are observed in the combustor section such that cooling airflow is provided to meet desired service life requirements. The combustor section typically includes a combustion chamber fondled by an inner and outer wall assembly. Each wall assembly includes a support shell lined with heat shields often referred to as liner panels. In certain combustion architectures, dilution passages direct airflow to condition air within the combustion chamber. In addition to the dilution passages, the shells may have relatively small air impingement passages to direct cooling air to impingement cavities between the support shell and the liner panels. This cooling air exits numerous effusion passages through the liner panels to effusion cool the passages and film cool a hot side of the liner panels to reduce direct exposure to the combustion gases.

With lower emission requirements and higher combustor operational temperatures, effective sealing between the shell and liner panels may be of increased significance. However, relatively large tolerances between the cast liner panels and sheet metal shell may complicate such effective sealing.

SUMMARY

A liner panel for use in a gas turbine engine, according to one disclosed non-limiting embodiment of the present disclosure, has a hot side and a cold side. This liner panel includes a rail extending from the cold side, and a multiple of studs extending from the cold side. At least one of the multiple of studs extend from, in part, the rail.

In a further embodiment of the present disclosure, each of the multiple of studs extends from the rail.

In a further embodiment of any of the foregoing embodiments of the present disclosure, the rail is an intermediate circumferential rail.

In a further embodiment of any of the foregoing embodiments of the present disclosure, a perimeter rail is included that extends around the liner panel to at least partially define an impingement cavity therein. The intermediate rail is within the perimeter rail.

In a further embodiment of any of the foregoing embodiments of the present disclosure, the perimeter rail forms a generally rectilinear boundary around the cold side.

In a further embodiment of any of the foregoing embodiments of the present disclosure, the liner panel is rectilinear.

In a further embodiment of any of the foregoing embodiments of the present disclosure, the intermediate rail is circumferentially arranged.

In a further embodiment of any of the foregoing embodiments of the present disclosure, the intermediate rail follows an arc formed by the cold side.

In a further embodiment of any of the foregoing embodiments of the present disclosure, a multiple of pedestals are included that extend from the cold side around the at least one of the multiple of studs.

A liner panel for use in a gas turbine engine, according to another disclosed non-limiting embodiment of the present disclosure, includes a forward circumferential rail; an aft circumferential rail axially aft of the forward circumferential rail; a first axial rail and a second axial rail that interconnects the aft circumferential rail and the forward circumferential rail; an intermediate circumferential rail that extends between the first axial rail and the second axial rail; and a multiple of studs that extend, in part, from the intermediate rail.

In a further embodiment of any of the foregoing embodiments of the present disclosure, the intermediate circumferential rail is parallel to the forward circumferential rail and the aft circumferential rail.

In a further embodiment of any of the foregoing embodiments of the present disclosure, a second intermediate circumferential rail is included that extends between the first axial rail and the second axial rail. A second multiple of studs are also included that extend from the second intermediate circumferential rail.

In a further embodiment of any of the foregoing embodiments of the present disclosure, the second intermediate circumferential rail is parallel to the intermediate circumferential rail.

In a further embodiment of any of the foregoing embodiments of the present disclosure, the liner panel is mountable within a combustor of the gas turbine engine.

In a further embodiment of any of the foregoing embodiments of the present disclosure, the liner panel includes a multiple of dilution passages therethrough.

In a further embodiment of any of the foregoing embodiments of the present disclosure, the multiple of dilution passages are located along a line generally parallel to the intermediate circumferential rail.

A method of assembling a wall assembly within a gas turbine engine, according to another disclosed non-limiting embodiment of the present disclosure, includes a locating a stud that extends in part from a rail of a liner panel through a support shell; and attaching a fastener onto the stud to retain the liner panel to the support shell.

In a further embodiment of any of the foregoing embodiments of the present disclosure, the method includes deflecting the support shell toward the liner panel to seal the rail with the support shell.

In a further embodiment of any of the foregoing embodiments of the present disclosure, the method includes defining an impingement cavity between the support shell and the liner panel.

In a further embodiment of any of the foregoing embodiments of the present disclosure, the method includes forming a dilution passage through the impingement cavity.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows:

FIG. 8 is an expanded longitudinal sectional view of a forward outer portion of a combustor wall assembly illustrating a gap according to one disclosed non-limiting embodiment with a contoured region of the shell in a first relaxed position;

FIG. 9 is an expanded longitudinal sectional view of a forward outer portion of a combustor wall assembly illustrating the contoured region of the shell in a second deformed position, closing the gap of FIG. 8;

FIG. 10 is a perspective view of a forward outer liner panel of a combustor wall assembly according to one disclosed non-limiting embodiment;

DETAILED DESCRIPTION

Figure 1:
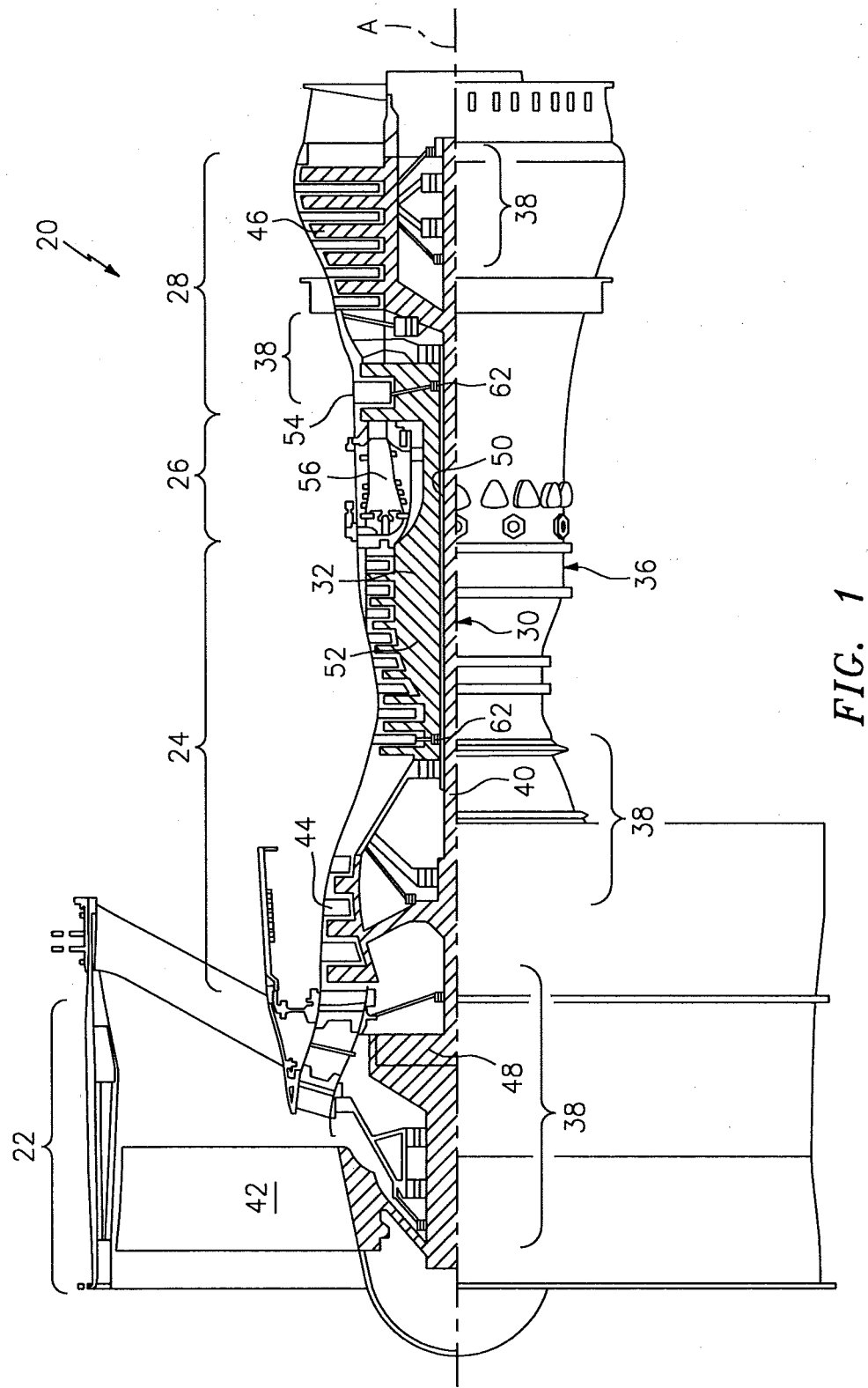
FIG. 1 is a schematic cross-section of an example gas turbine engine architecture.
Figure 2:
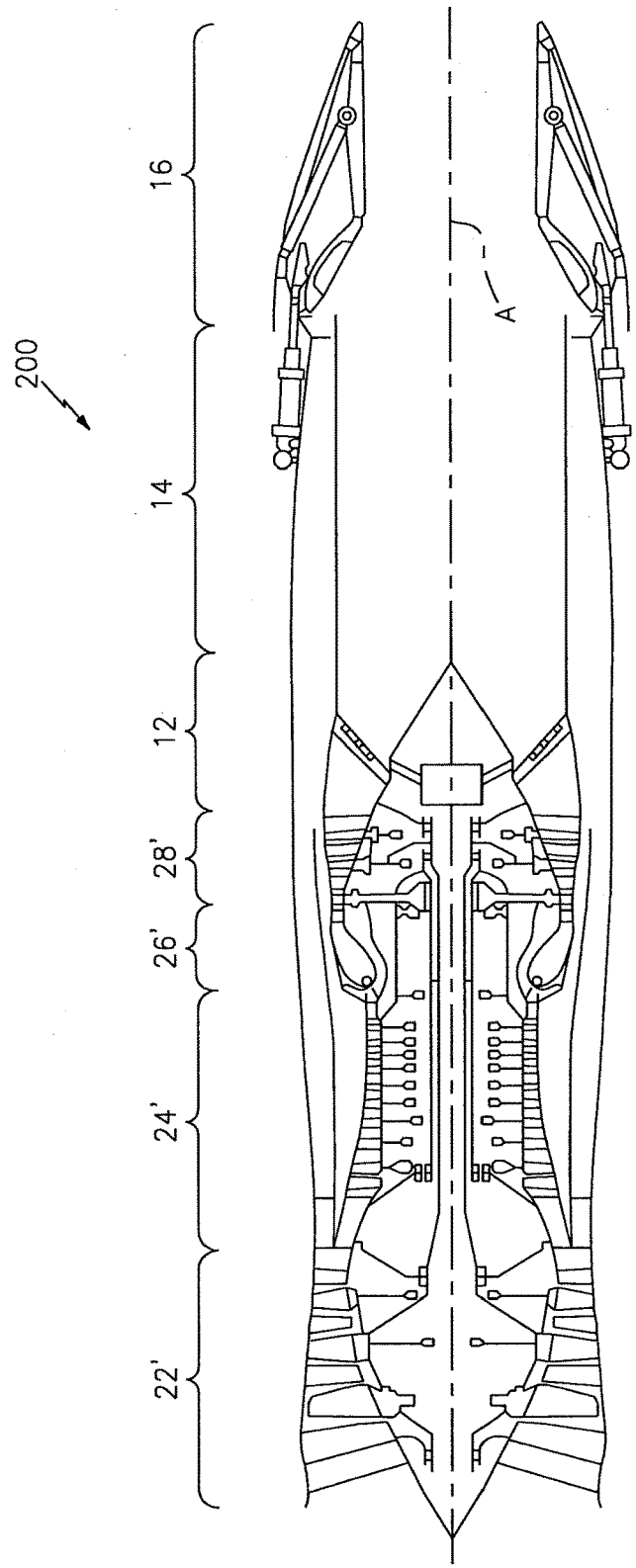
FIG. 2 is a schematic cross-section of another example gas turbine engine architecture.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Alternative engine architectures 200 might include an augmentor section 12, an exhaust duct section 14 and a nozzle section 16 in addition to the fan section 22', compressor section 24', combustor section 26' and turbine section 28' (see FIG. 2) among other systems or features. The fan section 22 drives air along a bypass flowpath and into the compressor section 24. The compressor section 24 drives air along a core flowpath for compression and communication into the combustor section 26, which then expands and directs the air through the turbine section 28. Although depicted as a turbofan in the disclosed non-limiting embodiment, it should be understood that the concepts described herein are not limited to use with turbofans as the teachings may be applied to other types of turbine engines such as a turbojets, turboshafts, and three-spool (plus fan) turbofans wherein an intermediate spool includes an Intermediate Pressure Compressor ("IPC") between a Low Pressure Compressor ("LPC") and a High Pressure Compressor ("HPC"), and an Intermediate Pressure Turbine ("IPT") between a High Pressure Turbine ("HPT") and a Low Pressure Turbine ("LPT").

The engine 20 generally includes a low spool 30 and a high spool 32 mounted for rotation about an engine central longitudinal axis A relative to an engine static structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 may drive the fan 42 directly or through a geared architecture 48 as shown in FIG. 1 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and a high pressure turbine ("HPT") 54. A combustor 56 is arranged between the HPC 52 and the HPT 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The LPT 46 and the HPT 54 rotationally drive the respective low spool 30 and the high spool 32 in response to the expansion. The main engine shafts 40, 50 are supported at a plurality of points by the bearing systems 38 within the static structure 36.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3, and in another example is greater than about 2.5:1. The geared turbofan enables operation of the low spool 30 at higher speeds which can increase the operational efficiency of the LPC 44 and the LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting embodiment, the bypass ratio of the gas turbine engine 20 is greater than about ten (10:1), the fan diameter is significantly larger than that of the LPC 44, and the LPT 46 has a pressure ratio that is greater than about five (5:1). It should be understood, however, that the above parameters are only exemplary of one embodiment of a geared architecture engine and that the present disclosure is applicable to other gas turbine engines including direct drive turbofans.

In one embodiment, a significant amount of thrust is provided by the bypass flow path due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of ("Tram"/518.7)$^{0.5}$. The Low Corrected Fan Tip Speed according to one non-limiting embodiment of the example gas turbine engine 20 is less than about 1150 fps (351 m/s).

Figure 3:
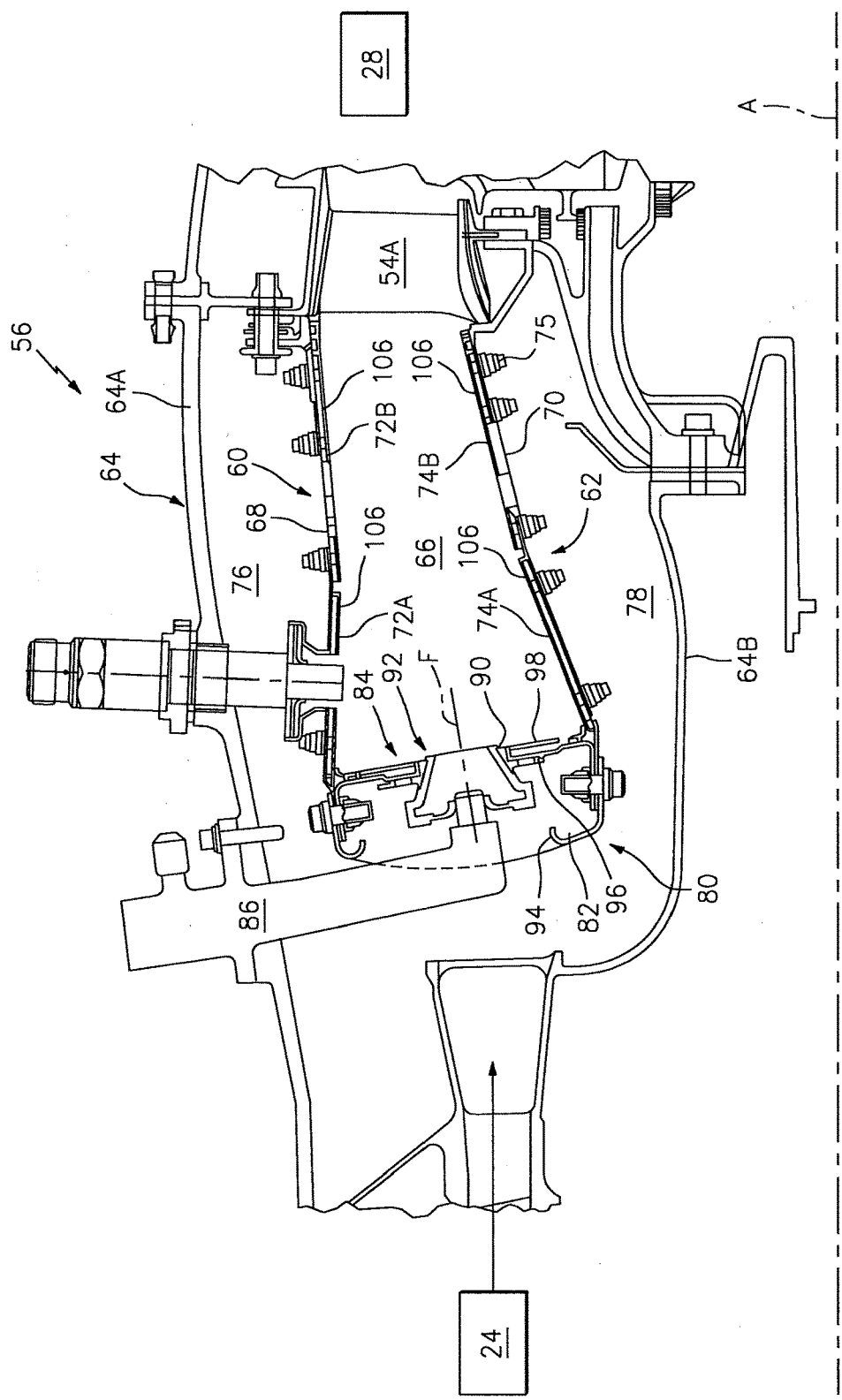
FIG. 3 is an expanded longitudinal schematic sectional view of a combustor section according to one non-limiting embodiment that may be used with the example gas turbine engine architectures shown in FIGS. 1 and 2.

With reference to FIG. 3, the combustor section 26 generally includes a combustor 56 with an outer combustor wall assembly 60, an inner combustor wall assembly 62 and a diffuser case module 64. The outer combustor wall assembly 60 and the inner combustor wall assembly 62 are spaced apart such that a combustion chamber 66 is defined therebetween. The combustion chamber 66 is generally annular in shape to surround the engine central longitudinal axis A.

The outer combustor liner assembly 60 is spaced radially inward from an outer diffuser case 64A of the diffuser case module 64 to define an outer annular plenum 76. The inner combustor liner assembly 62 is spaced radially outward from an inner diffuser case 64B of the diffuser case module 64 to define an inner annular plenum 78. It should be understood that although a particular combustor is illustrated, other combustor types with various combustor liner arrangements will also benefit herefrom. It should be further understood that the disclosed cooling flow paths are but an illustrated embodiment and should not be limited only thereto.

The combustor wall assemblies 60, 62 contain the combustion products for direction toward the turbine section 28. Each combustor wall assembly 60, 62 generally includes a respective support shell 68, 70 which supports one or more liner panels 72A, 72B (generally referred to as "72") and 74A, 74B (generally referred to as "74") mounted thereto that are arranged to form a liner array. The support shells 68, 70 may be manufactured by, for example, the hydroforming of a sheet metal alloy to provide the generally cylindrical outer shell 68 and inner shell 70. Each of the liner panels 72, 74 may be generally rectilinear with a circumferential arc. The liner panels 72, 74 may be manufactured of, for example, a nickel based super alloy, ceramic or other temperature resistant material. In one disclosed non-limiting embodiment, the liner array includes a multiple of forward liner panels 72A and a multiple of aft liner panels 72B that are circumferentially staggered to line the outer shell 68. A multiple of forward liner panels 74A and a multiple of aft liner panels 74B are circumferentially staggered to line the inner shell 70.

The combustor 56 further includes a forward assembly 80 immediately downstream of the compressor section 24 to receive compressed airflow therefrom. The forward assembly 80 generally includes a cowl 82, a bulkhead assembly 84, and a multiple of swirlers 90 (one shown). Each of the swirlers 90 is circumferentially aligned with one of a multiple of fuel nozzles 86 (one shown) and the respective hood ports 94 to project through the bulkhead assembly 84.

The bulkhead assembly 84 includes a bulkhead support shell 96 secured to the combustor walls 60, 62, and a multiple of circumferentially distributed bulkhead liner panels 98 secured to the bulkhead support shell 96 around the swirler opening. The bulkhead support shell 96 is generally annular and the multiple of circumferentially distributed bulkhead liner panels 98 are segmented, typically one to each fuel nozzle 86 and swirler 90.

The cowl 82 extends radially between, and is secured to, the forward most ends of the combustor walls 60, 62. The cowl 82 includes a multiple of circumferentially distributed hood ports 94 that receive one of the respective multiple of fuel nozzles 86 and facilitates the direction of compressed air into the forward end of the combustion chamber 66 through a swirler opening 92. Each fuel nozzle 86 may be secured to the diffuser case module 64 and project through one of the hood ports 94 and through the swirler opening 92 within the respective swirler 90.

The forward assembly 80 introduces core combustion air into the forward section of the combustion chamber 66 while the remainder enters the outer annular plenum 76 and the inner annular plenum 78. The multiple of fuel nozzles 86 and adjacent structure generate a blended fuel-air mixture that supports stable combustion in the combustion chamber 66.

Opposite the forward assembly 80, the outer and inner support shells 68, 70 are mounted to a first row of Nozzle Guide Vanes (NGVs) 54A in the HPT 54. The NGVs 54A are static engine components which direct core airflow combustion gases onto the turbine blades of the first turbine rotor in the turbine section 28 to facilitate the conversion of pressure energy into kinetic energy. The core airflow combustion gases are also accelerated by the NGVs 54A because of their convergent shape and are typically given a "spin" or a "swirl" in the direction of turbine rotor rotation. The turbine rotor blades absorb this energy to drive the turbine rotor at high speed.

Figure 4:
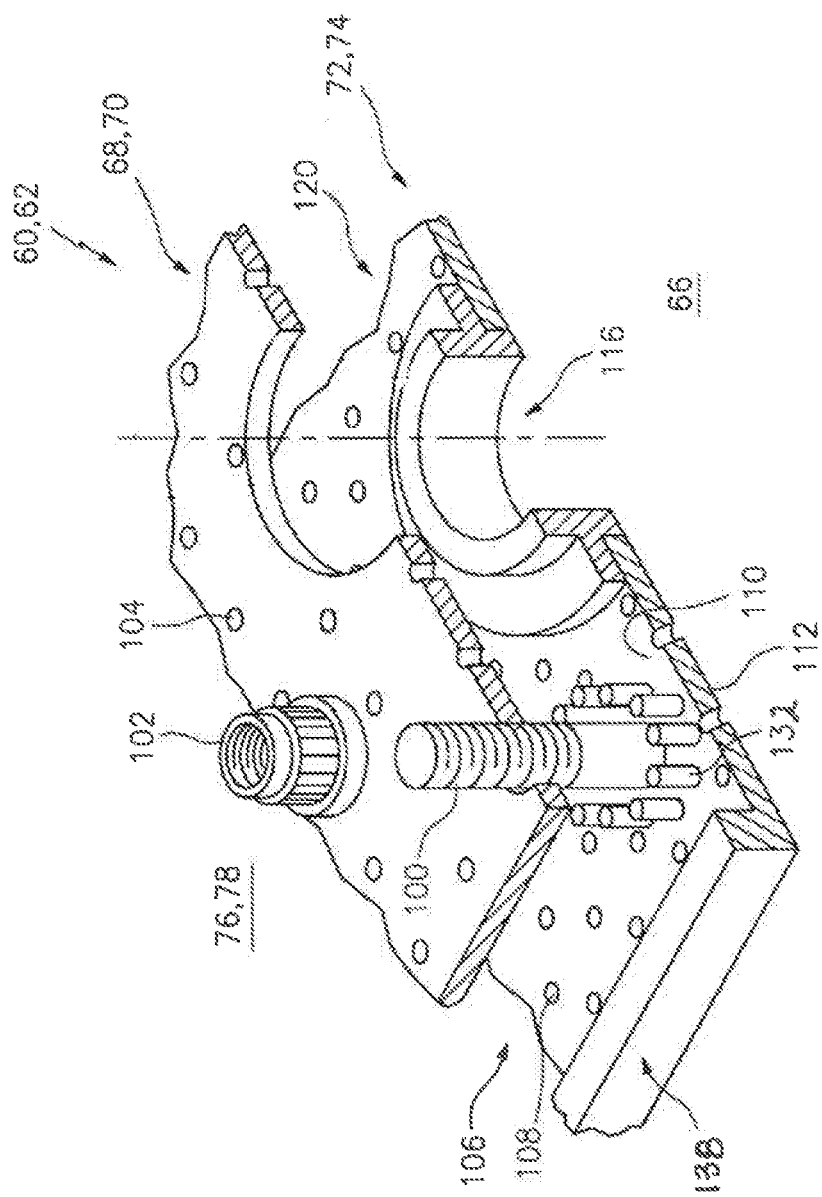
FIG. 4 is an exploded partial sectional view of a portion of a combustor wall assembly.
Figure 5:
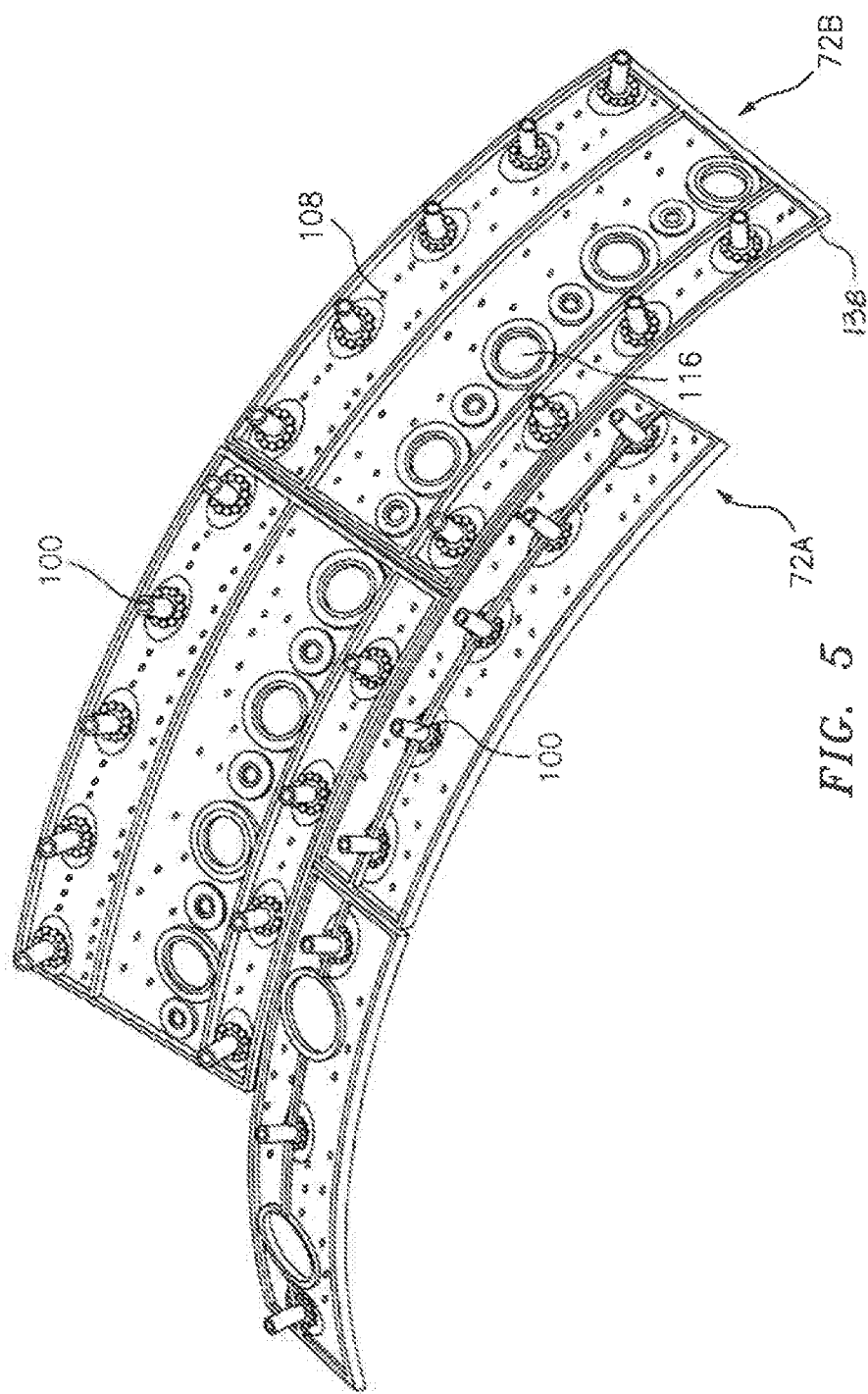
FIG. 5 is a perspective view of a portion of a liner panel array.

With reference to FIG. 4, a multiple of studs 100 extend from each of the liner panels 72, 74 so as to permit an array (see FIG. 5) of the liner panels 72, 74 to be mounted to their respective support shells 68, 70 with fasteners 102 (see FIG. 6) such as nuts. That is, the studs 100 project rigidly from the liner panels 72, 74 and through the respective support shells 68, 70 to receive the fasteners 102 at a threaded section thereof.

A multiple of cooling impingement passages 104 penetrate through the support shells 68, 70 to allow air from the respective annular plenums 76, 78 to enter cavities 106 formed in the combustor walls 60, 62 between the respective support shells 68, 70 and liner panels 72, 74. The cooling impingement passages 104 are generally normal to the surface of the liner panels 72, 74. The air in the cavities 106 provide cold side impingement cooling of the liner panels 72, 74 that is generally defined herein as heat removal via internal convection.

A multiple of effusion passages 108 penetrate through each of the liner panels 72, 74. The geometry of the passages (e.g., diameter, shape, density, surface angle, incidence angle, etc.) as well as the location of the passages with respect to the high temperature main flow also contributes to effusion film cooling. The combination of impingement passages 104 and effusion passages 108 may be referred to as an Impingement Film Floatwall (IFF) assembly.

The effusion passages 108 allow the air to pass from the cavities 106 defined in part by a cold side 110 of the liner panels 72, 74 to a hot side 112 of the liner panels 72, 74 and thereby facilitate the formation of a thin, cool, insulating blanket or film of cooling air along the hot side 112. The effusion passages 108 are generally more numerous than the impingement passages 104 to promote the development of film cooling along the hot side 112 to sheath the liner panels 72, 74. Film cooling as defined herein is the introduction of a relatively cooler air at one or more discrete locations along a surface exposed to a high temperature environment to protect that surface in the region of the air injection as well as downstream thereof.

A multiple of dilution passages 116 may penetrate through both the respective support shells 68, 70 and liner panels 72, 74 along a common axis. For example only, in a Rich-Quench-Lean (R-Q-L) type combustor, the dilution passages 116 are located downstream of the forward assembly 80 to quench the hot combustion gases within the combustion chamber 66 by direct supply of cooling air from the respective annular plenums 76, 78.

Figure 6:
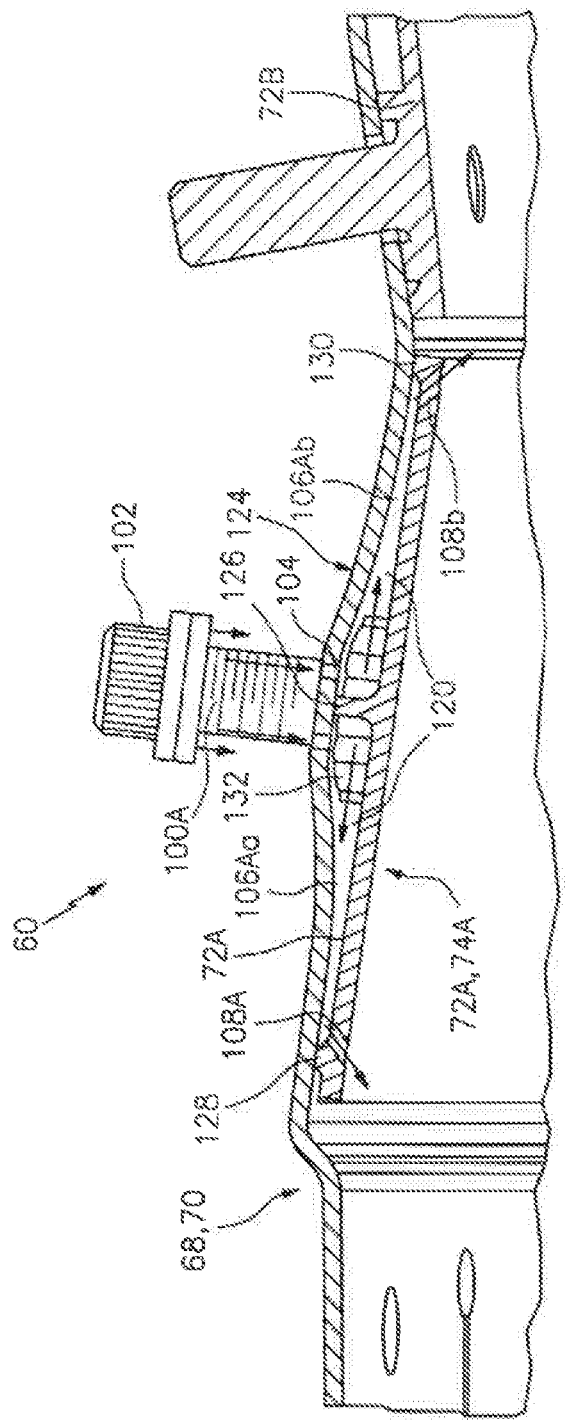
FIG. 6 is an expanded longitudinal sectional view of a forward outer portion of a combustor wall assembly illustrating a contoured region of a support shell according to one disclosed non-limiting embodiment.

With reference to FIG. 6, in one disclosed non-limiting embodiment, a portion of each of the respective support shells 68, 70 is non-parallel with respect to the forward liner panels 72A, 74A to form a convergent passage 120 therebetween along a contoured region 124. That is, the contoured region 124 is a radially displaced profile section of the respective support shells 68, 70 with respect to the engine axis A. Although the forward liner panels 72A, and the respective forward portion of the outer support shell 68 will be specifically described and illustrated in some of the disclosed non-limiting embodiments, it should be appreciated that the inner support shell 70 as well as various other wall assemblies within a gas turbine engine such as within the walls of the augmentor section 12, the exhaust duct section 14 and the nozzle section 16 (see FIG. 2) may alternatively or additionally benefit herefrom. That is, the contoured region 124 may be alternatively or additionally located within engine sections other than the combustor section 26 which utilize a support shell, liner panel type wall arrangement. The various contoured regions 124 form one or more convergent passages 120 for panel cooling air by varying the profile of the combustor shell adjacent to the respective liner panels. Various contours and configurations are possible to tailor the location of the effusion air exit, and optimize heat transfer, pressure loss, manufacturability, NOx reduction, etc. Beneficially, the contoured regions do not require additional hardware over conventional float wall combustor panels to create the convergence and are readily produced with current manufacturing methods.

In this disclosed non-limiting embodiment, the contoured region 124 of the support shell 68 defines a hyperbolic cosine (COSH) profile in longitudinal cross-section that extends away from the forward liner panels 72A. That is, the forward liner panels 72A are generally linear in longitudinal cross-section, while the contoured region 124 is non-linear in longitudinal cross-section. For perspective, in this disclosed non-limiting embodiment, each of the forward liner panels 72A defines an axial length of about 1.5 inches (38 mm) and each may extend over a circumferential arc of about forty (40) degrees (one shown in FIG. 7).

The contoured region 124 is located adjacent to a row of studs 100A, and an intermediate circumferential rail 126 is located between a forward circumferential rail 128 and an aft circumferential rail 130. Each of the studs 100A may be at least partially surrounded by posts 132 to at least partially support the fastener 102 and operate as stand-offs between the support shell 68 and the forward liner panels 72A.

Figure 7:
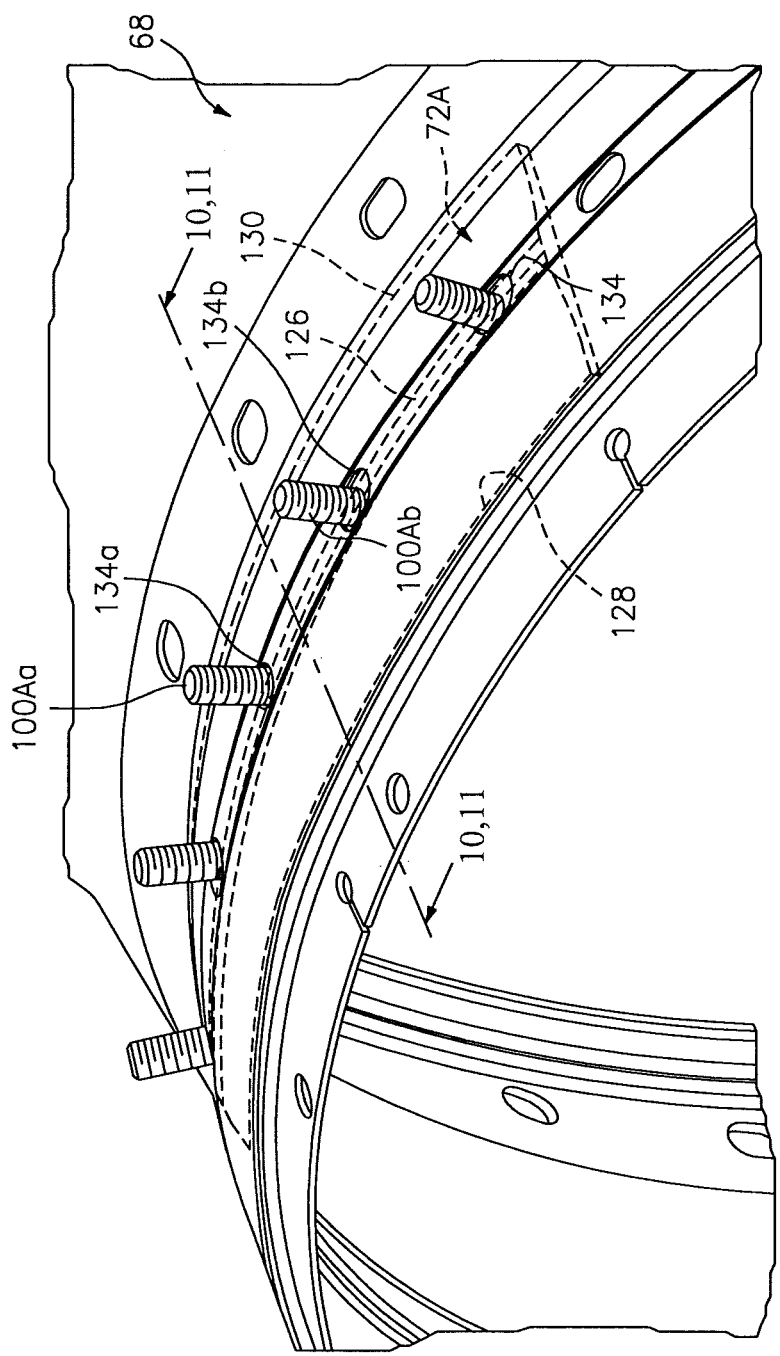
FIG. 7 is a perspective partial phantom view of one forward outer liner panel mounted to a support shell.
Figure 11:
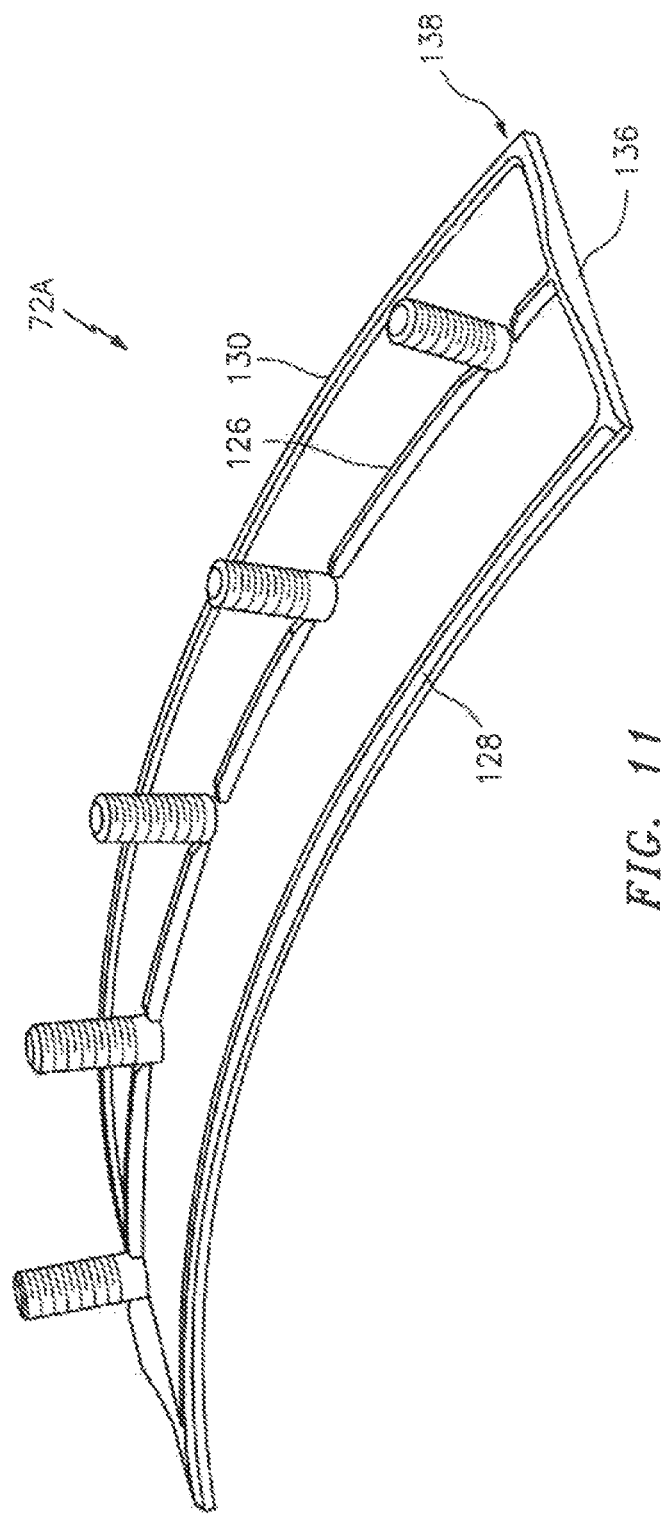
FIG. 11 is a perspective view of a forward outer liner panel of a combustor wall assembly according to another disclosed non-limiting embodiment.

Each of the forward liner panels 72A, in one disclosed non-limiting embodiment, includes a single row of studs 100A (Five shown in FIG. 7) that extend through respective stud apertures 134 in the support shell 68. A center or "king" stud 100Aa is received within a central circular stud aperture 134a while the remainder of the studs 100Ab are received within elongated apertures 134b to facilitate operational thermal growth relative to the center or "king" stud 100Aa (FIG. 7).

With continued reference to FIG. 6, the contoured regions 124 form respective boundaries of impingement cavities 106Aa, 106Ab that respectively converge toward the forward circumferential rail 128 and the aft circumferential rail 130. As shown, the cavity 106A is subdivided by the intermediate circumferential rail 126 into the forward cavity 106Aa and the aft cavity 106Ab. The forward cavity 106Aa and the aft cavity 106Ab thereby accelerate and direct impingement airflow from impingement passages 104 on each respective side of the intermediate circumferential rail 126 toward forward effusion apertures 108a and aft effusion apertures 108b. The forward effusion apertures 108a and the aft effusion apertures 108b may define respective angles through the forward liner panels 72A to direct effusion airflow generally forward and aft into the combustion chamber 66. It should be appreciated that various contours and configurations are possible to tailor the location of the effusion air passages to optimize heat transfer, pressure loss, manufacturability, etc., without need for additional hardware between the respective support shell 68 and the forward liner panels 72A.

Referring to FIGS. 8-11, axial end rails 136 circumferentially close-out each forward liner panels 72A with respect to the support shell 68. That is, the forward circumferential rail 128 and the aft circumferential rail 130 are located at relatively constant curvature axial interfaces while the axial end rails 136 extend across an axial length of the support shell 68 to complete a perimeter rail 138 that seals the periphery of each forward liner panels 72A with respect to the respective support shell 68.

With reference to FIG. 8, each axial end rail 136 and the contoured region 124 define a respective rail profile 140 and support shell profile 142 contoured to form a gap G (e.g., a preassembly gap). That is, the rail profile 140 of the axial end rails 136 and the support shell profile 142 of the contoured region 124 are of a slightly different profile such that the gap G is located in an area 150 generally axially adjacent to the intermediate rail 126 to form respective axial reacting areas 152A, 152B adjacent to the forward circumferential rail 128 and the aft circumferential rail 130. In one disclosed non-limiting embodiment, the typical gap G is about 0.005-0.020 inches (0.1-0.5 mm).

The gap G is closed in response to deflection of the contoured region 124 as the fasteners 102 are tightened onto the studs 100 (see FIG. 9). That is, the support shell profile 142 slides along the respective axial engagement areas 152A, 152B as the fasteners 102 are engaged.

As the fasteners 102 are tightened onto the studs 100, the attachment at least partially elastically deflects the support shell 68 adjacent to the intermediate rail 126 and produces a tight seal between the perimeter rail 138 and the support shell 68 to assure an effective seal therebetween. It should be further appreciated that the intermediate rail 126 may be of the same height from the cold side 110 as the forward circumferential rail 128 and the aft circumferential rail 130 or alternatively, of a lesser height to further facilitate formation of the gap G.

The elastic deformation of the support shell 68 to seal with the intermediate rail 126 reduces—or eliminates—leakage to facilitate formation of relatively large pressure drops across the liner panels 72, 74 and thereby increase cooling effectiveness. That is, tightening of the fasteners 102 closes the gap G such that the contoured region 124 closely follows the axial end rails 136 to circumferentially close-out and form an interference fit between each of the forward liner panels 72A with respect to the associated support shell 68. It should be appreciated that fasteners such as clips and mechanisms other than threads may alternatively or additionally be utilized to minimize leakage from both the neighboring rail and adjacent rails.

With reference to FIG. 10, in one disclosed non-limiting embodiment, the multiple of studs 100A extend from the intermediate rail 126. That is, the studs 100A are aligned with, and may at least partially form, the intermediate rail 126. It should be appreciated that the studs 100A may also at least partially extend from the cold side 110. That is, the relatively cylindrical studs 100A extend beyond and form a footprint greater than the intermediate rail 126.

In this disclosed non-limiting embodiment, each of the studs 100A may be at least partially surrounded by posts 132 which extend from the cold side 110 to at least partially support the fastener 102. In another disclosed non-limiting embodiment, the studs 100A are not surrounded by the posts 132 as the intermediate rail 126 provides adequate support for the respective fastener 102 (see FIG. 11).

Figure 12:
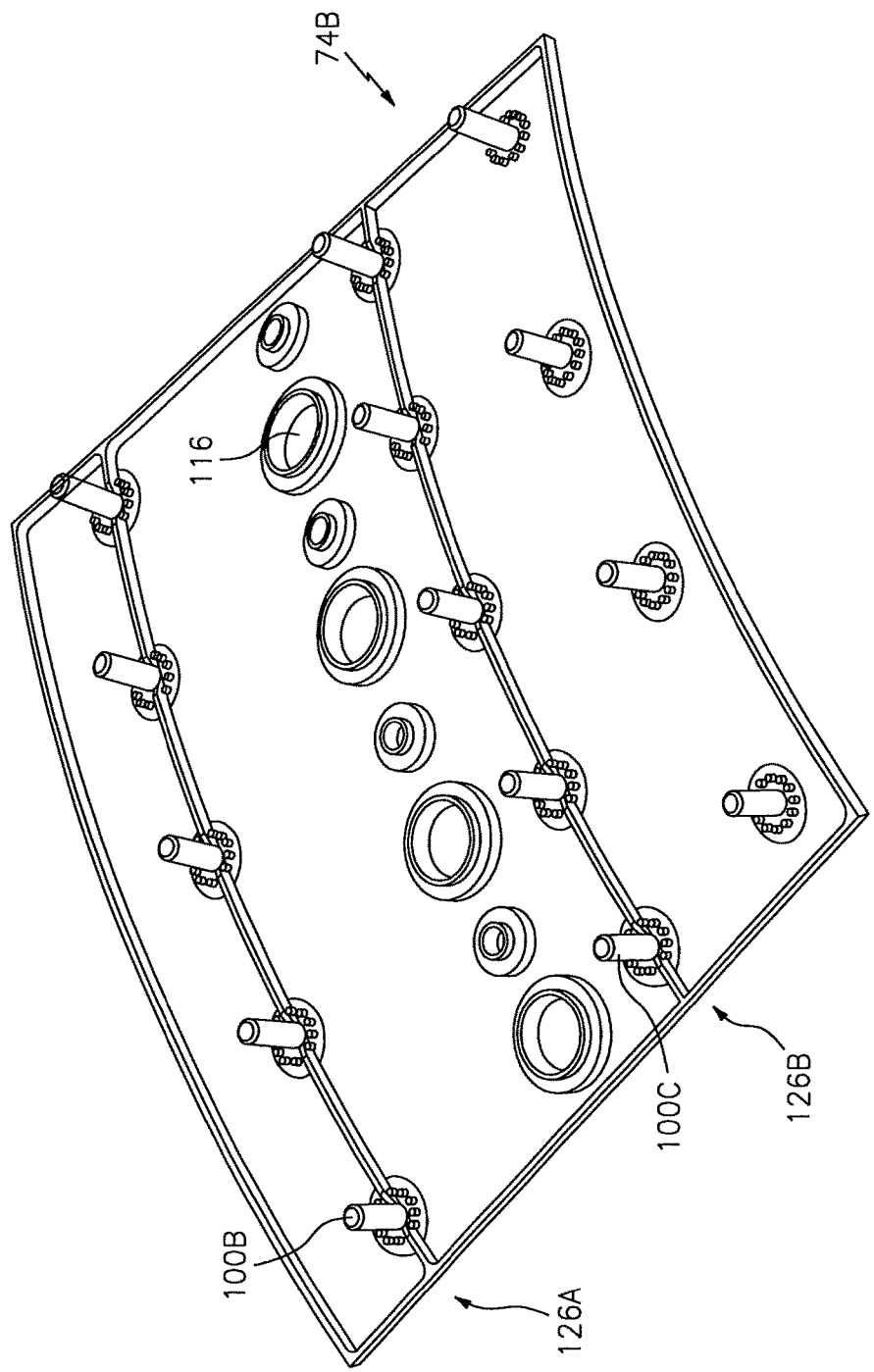
FIG. 12 is an expanded perspective view of an aft outer liner panel with a multiple of circumferential rails according to another disclosed non-limiting embodiment to minimize leakage from both the neighboring rail and adjacent rails.

With reference to FIG. 12, in another disclosed non-limiting embodiment, multiple intermediate rails 126A, 126B (two shown) with associated studs 100B, 100C extend from a single liner panel 74—here shown as an aft outer liner panel 74B. In this disclosed non-limiting embodiment, the dilution passages 116 are located axially between the intermediate rails 126A, 126B.

Location of studs 100 on the intermediate rails 126 facilitates an effective seal between the liner panels 72, 74 and respective support shell 68, 70 that reduces leakage to facilitate formation of a relatively larger pressure drops across the liner panels 72, 74 and thereby increase cooling effectiveness.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the features within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A liner panel for use in a gas turbine engine, the liner panel having a hot side and a cold side and the liner panel comprising:

first and second axial rails projecting perpendicularly out from the cold side, the first axial rail having a first vertical height that changes as the first axial rail extends axially along an axis about which the liner panel extends;

an intermediate circumferential rail projecting perpendicularly out from the cold side and extending circumferentially about the axis between the first axial rail and the second axial rail;

a multiple of studs extending from the cold side, at least one of the multiple of studs extending from, in part, the intermediate circumferential rail;

a multiple of pedestals that extend from the cold side around at least one of the multiple of stud;

a forward circumferential rail projecting perpendicularly out from the cold side comprising a second vertical height; and an aft circumferential rail projecting perpendicularly out from the cold side, axially aft of the forward circumferential rail;

wherein the intermediate circumferential rail comprising a third vertical height that is different from the second vertical height; and wherein a portion of a support shell opposite the liner panel is non-parallel with respect to the liner panel thereby forming a convergent passage between the portion of the support shell and the cold side of the liner panel.

2. The liner panel as recited in claim 1, wherein each of the multiple of studs extends from the intermediate circumferential rail.

3. The liner panel as recited in claim 1, further comprising a perimeter rail that extends around the liner panel to at least partially define an impingement cavity therein, the intermediate circumferential rail within the perimeter rail, and the perimeter rail comprising the first axial rail, the forward circumferential rail, the aft circumferential rail, and the second axial rail.

4. The liner panel as recited in claim 3, wherein the perimeter rail forms a generally rectilinear boundary around the cold side.

5. The liner panel as recited in claim 4, wherein the liner panel is rectilinear.

6. The liner panel as recited in claim 1, wherein the intermediate circumferential rail follows an arc formed by the cold side.

7. A liner panel for use in a gas turbine engine, the liner panel having a hot side and a cold side and the liner panel comprising:

a forward circumferential rail extending from the cold side comprising a first vertical height;

an aft circumferential rail extending from the cold side, axially aft of the forward circumferential rail;

at least first and second axial rails extending from the cold side that interconnect the aft circumferential rail and the forward circumferential rail;

the first axial rail having a second vertical height that changes as the first axial rail extends axially along an axis about which the liner panel extends;

an intermediate circumferential rail extending from the cold side that extends circumferentially about the axis between the first axial rail and the second axial rail, the intermediate circumferential rail comprising a third vertical height that is different from the first vertical height;

a multiple of studs that extend, in part, from the intermediate circumferential rail;

a plurality of protrusions that project out from the cold side and are arranged about a first of the multiple of studs; and wherein a portion of a support shell opposite the liner panel is non-parallel with respect to the liner panel thereby forming a convergent passage between the portion of the support shell and the cold side of the liner panel.

8. The liner panel as recited in claim 7, wherein the intermediate circumferential rail is parallel to the forward circumferential rail and the aft circumferential rail.

9. The liner panel as recited in claim 7, further comprising a second intermediate circumferential rail that extends between the first axial rail and the second axial rail and a second multiple of studs that extend from the second intermediate circumferential rail.

10. The liner panel as recited in claim 9, wherein the second intermediate circumferential rail is parallel to the intermediate circumferential rail.

11. The liner panel as recited in claim 7, wherein the liner panel is mountable within a combustor of the gas turbine engine.

12. The liner panel as recited in claim 7, wherein the liner panel includes a multiple of dilution passages therethrough.

13. The liner panel as recited in claim 12, wherein the multiple of dilution passages are located along a line generally parallel to the intermediate circumferential rail.

14. A method of assembling a wall assembly within a gas turbine engine, comprising:

providing a stud that extends in part from an intermediate circumferential rail of a cold side of a liner panel through a support shell, wherein the liner panel extends about an axis and further includes a first axial rail comprising a first vertical height, a second axial rail, a forward circumferential rail having a second vertical height, an aft circumferential rail, and a plurality of posts that extend out from the cold side of the liner panel, wherein the posts are arranged around the stud, wherein the first vertical height changes as the first axial rail extends axially along the axis, and wherein the intermediate circumferential rail extends circumferentially about the axis between the first axial rail and the second axial rail, and comprises a third vertical height that is different from the second vertical height;

and attaching a fastener onto the stud to retain the liner panel to the support shell, wherein a portion of the support shell opposite the liner panel is non-parallel with respect to the liner panel thereby forming a convergent passage between the portion of the support shell and the liner panel.

15. The method as recited in claim 14, further comprising deflecting the support shell toward the liner panel to seal the intermediate circumferential rail with the support shell.

16. The method as recited in claim 14, further comprising defining an impingement cavity between the support shell and the liner panel.

17. The method as recited in claim 16, further comprising forming a dilution passage through the impingement cavity.

* * * * *

UNITED STATES PATENT AND TRADEMARK OFFICE
CERTIFICATE OF CORRECTION

| | |
|---|---|
| PATENT NO. | : 10,088,161 B2 |
| APPLICATION NO. | : 15/038906 |
| DATED | : October 2, 2018 |
| INVENTOR(S) | : Christopher Drake, Stanislav Kostka, Jr. and Frank J. Cunha |

It is certified that error appears in the above-identified patent and that said Letters Patent is hereby corrected as shown below:

In the Claims

In Column 10, Line 28, in Claim 1, remove stud and insert -- studs --

Signed and Sealed this
Eighth Day of January, 2019

Andrei Iancu
*Director of the United States Patent and Trademark Office*